United States Patent
O'Connell et al.

(10) Patent No.: US 7,596,564 B1
(45) Date of Patent: Sep. 29, 2009

(54) METHOD AND SYSTEM FOR CACHE MANAGEMENT OF A CACHE INCLUDING DYNAMICALLY-GENERATED CONTENT

(75) Inventors: Conleth S. O'Connell, Austin, TX (US); Mark Scheevel, Austin, TX (US)

(73) Assignee: Vignette Corporation, Austin, TX (US)

( * ) Notice: Subject to any disclaimer, the term of this patent is extended or adjusted under 35 U.S.C. 154(b) by 1343 days.

(21) Appl. No.: 09/965,914

(22) Filed: Sep. 28, 2001

Related U.S. Application Data

(60) Provisional application No. 60/236,618, filed on Sep. 29, 2000.

(51) Int. Cl.
G06F 17/30 (2006.01)

(52) U.S. Cl. .............................. 707/10; 707/1; 709/219

(58) Field of Classification Search .................. 707/10, 707/102, 201, 9, 1; 709/219, 217, 202, 203, 709/246; 711/133
See application file for complete search history.

(56) References Cited

U.S. PATENT DOCUMENTS

| | | | | |
|---|---|---|---|---|
| 5,202,982 | A | 4/1993 | Gramlich et al. ............. 395/600 |
| 5,473,772 | A | 12/1995 | Halliwell et al. ............. 395/650 |
| 5,504,879 | A | 4/1996 | Eisenberg et al. ............ 395/600 |
| 5,740,430 | A | 4/1998 | Rosenberg et al. ........... 395/616 |
| 6,151,624 | A | 11/2000 | Teare et al. |
| 6,192,415 | B1 | 2/2001 | Haverstock et al. |
| 6,198,824 | B1 | 3/2001 | Shambroom |
| 6,219,676 | B1 * | 4/2001 | Reiner ......................... 707/201 |
| 6,272,492 | B1 | 8/2001 | Kay et al. |
| 6,330,592 | B1 * | 12/2001 | Makuch et al. .............. 709/217 |
| 6,408,360 | B1 | 6/2002 | Chamberlain et al. |
| 6,560,633 | B1 * | 5/2003 | Roberts et al. ............... 709/202 |
| 6,571,246 | B1 | 5/2003 | Anderson et al. |
| 6,591,266 | B1 * | 7/2003 | Li et al. ........................ 707/10 |
| 6,651,217 | B1 | 11/2003 | Kennedy et al. |
| 6,681,298 | B1 * | 1/2004 | Tso et al. ..................... 711/133 |
| 6,697,844 | B1 | 2/2004 | Chan et al. |
| 6,697,849 | B1 * | 2/2004 | Carlson ....................... 709/219 |
| 6,701,428 | B1 | 3/2004 | Harvey, III et al. |

(Continued)

OTHER PUBLICATIONS

Dasgupta, Partha, "Resource Location in Very Large Networks," IEEE, pp. 156-163, May 1994.

(Continued)

*Primary Examiner*—Le Luu
(74) *Attorney, Agent, or Firm*—Sprinkle IP Law Group

(57) ABSTRACT

A method and system are disclosed for cache management and regeneration of dynamically-generated content ("DGC") in a client-server computer network. One embodiment of the method of this invention comprises the steps of; in response to a regeneration event, identifying a set of one or more previously cached DGC components affected by the regeneration event; regenerating a new version of each affected DGC component in the set to incorporate a criteria associated with the regeneration event; and replacing each affected DGC component in the set with the respective new version of each. The method can further comprise the step of serving the new version of one or more of the affected DGC components to a client computer in the client-server network in response to a client computer request. The method can further comprise the step of serving the one or more new versions of the affected DGC components in the form of a dynamically-generated page.

61 Claims, 2 Drawing Sheets

U.S. PATENT DOCUMENTS

| | | |
|---|---|---|
| 6,754,621 B1 | 6/2004 | Cunningham et al. |
| 6,757,708 B1 * | 6/2004 | Craig et al. ................. 709/203 |
| 6,769,010 B1 * | 7/2004 | Knapp et al. ................ 709/203 |
| 6,832,222 B1 * | 12/2004 | Zimowski ...................... 707/9 |
| 6,850,941 B1 | 2/2005 | White et al. |
| 2001/0032254 A1 | 10/2001 | Hawkins |
| 2001/0034771 A1 | 10/2001 | Hutsch et al. |
| 2002/0065912 A1 | 5/2002 | Catchpole et al. |
| 2002/0165877 A1 | 11/2002 | Malcolm et al. |
| 2002/0178187 A1 | 11/2002 | Rasmussen et al. |
| 2003/0217117 A1 | 11/2003 | Dan et al. |
| 2004/0030697 A1 | 2/2004 | Cochran et al. |
| 2004/0205452 A1 | 10/2004 | Fitzsimmons et al. |

OTHER PUBLICATIONS

Vetter, Ronald, J., "Mosaic and the World-Wide Web," IEEE, pp. 49-57, Oct. 1994.

Obraczka et al., "Internet Resource Discovery Services," IEEE, p. 8-22, Sep. 1993.

Sharma et al., "Hypertext Based Distributed Object Management for Information Location and Retrieval," IEEE, pp. 102-107, 1993.

wysiwyg://101/http://msdn.microsof....brary/wcedoc/wcesecur/crypto_1.htm, pp. 1-2, 2001.

Turley, "Design Specification for Packaged Application Support in Assassin," pp. 2-6, 1999.

Turley, Functional Specification for Packaged Application Support in Assassin, pp. 2-6, 1999.

* cited by examiner

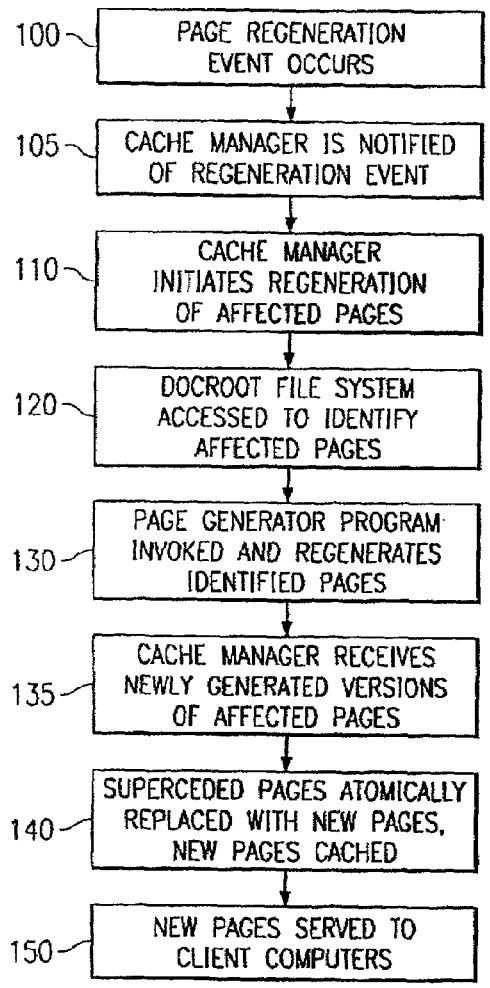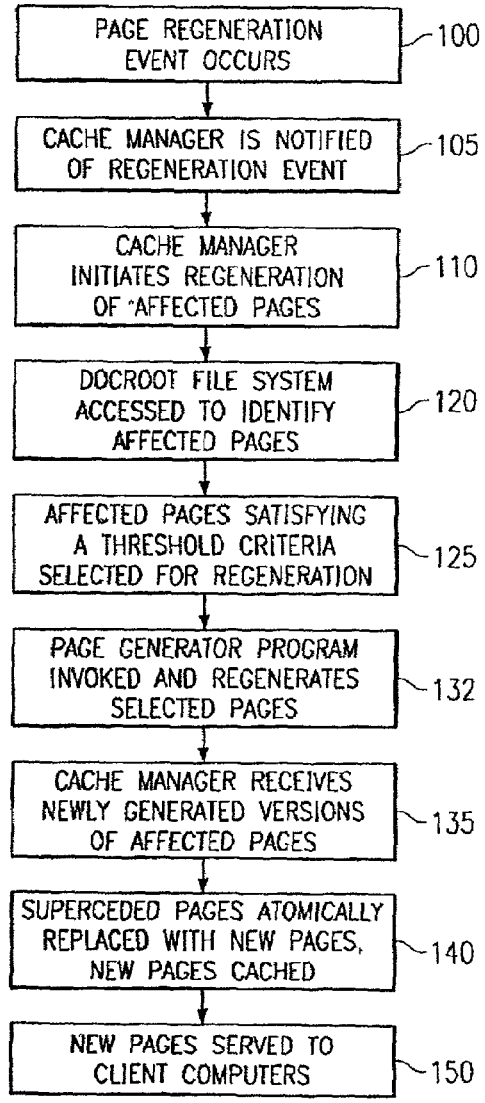

METHOD AND SYSTEM FOR CACHE MANAGEMENT OF A CACHE INCLUDING DYNAMICALLY-GENERATED CONTENT

RELATED APPLICATIONS

This application claims priority under 35 U.S.C. § 119(e) to U.S. Patent Application No. 60/236,618 entitled "Method and System for Cache Management of Dynamically-Generated Content" by Conleth S. O'Connell and Mark Scheevel filed Sep. 29, 2000, which is incorporated by reference as if set forth in its entirety herein.

TECHNICAL FIELD OF THE INVENTION

This invention relates generally to the operation of client-server computer networks. More particularly, the present invention relates to methods and systems for caching dynamically-generated content on a server computer. Even more particularly, the present invention relates to a method and system for the regeneration and file management of previously cached dynamically-generated content.

BACKGROUND OF THE INVENTION

The Internet, and in particular the World-Wide Web ("WWW"), is a large collection of computers operated under a client-server computer network model. In a client-server computer network, a client computer requests information from a server computer. In response to the request, the server computer provides the requested information to the client computer. Client computers are typically operated by individuals. Server computers are typically operated by large information providers, such as commercial organizations, government entities and universities.

To ensure the interoperability of the potentially different computers in a client-server computer network, various protocols are observed. For example, the Hypertext Transport Protocol ("HTTP") is used for transporting hypertext files over the Internet. In addition, the WWW observes a number of protocols for organizing and presenting information, such as the Hypertext Markup Language ("HTML") protocol and the Extensible Markup Language ("XML") protocol.

Various protocols, and in particular the HTTP protocol, support a feature known as "dynamically-generated customized pages." A dynamically-generated customized page comprises a set of content (information) in a particular format. The same set of information can be presented in various ways, depending upon whether a particular format is supported by the requesting client computer. For example, a first client computer may support the ability to present information in columns, while a second client computer may instead support the ability to present information in the form of a table. A server computer receiving an information request from the first client computer will dynamically generate the requested content in a column format, while responding to a request from the second client computer with a dynamically-generated page that presents the requested content in the form of a table. Thus, two different customized pages can be created to represent the same content. Any protocol that exchanges client capability information can provide this functionality. For example, 3G (third generation) wireless protocols, WAP (wireless application protocol) and FTP (file transfer protocol).

Computer executable instructions are used to dynamically generate customized pages (content). U.S. Pat. No. 5,740,430, entitled "Method and Apparatus for Server Independent Caching of Dynamically-generated Customized Pages," issued on Apr. 14, 1998, to Rosenberg, et al. (the "Caching Application"), discloses a method and apparatus to efficiently respond to a large number of requests for customized pages. In particular, the Caching Application discloses a method and apparatus for operating a client-server computer network such that a server computer dynamically generates and then stores customized pages requested from a client computer. Subsequent requests for previously generated customized pages are retrieved from a cache in the server computer. Since previously generated customized pages need not be regenerated, computational overhead is reduced. The Caching Application is hereby incorporated by reference in its entirety.

The invention disclosed in the Caching Application is highly advantageous because it does not require the dynamic generation of a customized page every time a customized page is requested. However, it suffers from several deficiencies. One such deficiency relates to the deletion of previously cached customized pages in response to, for example, a change in the template from which a dynamically-generated customized page is generated.

Dynamically-generated pages ("DGPs") comprise dynamically-generated content ("DGC") that can be in the form of components. Content components on a page can be changed (updated) independently of one another, in groups, or as a whole. DGPs (and DGC) are generated from templates in a computer system (such as a server computer). The server computer includes stored computer executable instructions ("computer programs") to dynamically generate the DGC (for purposes of this document, DGC will be used to include DGPs, and vice versa, unless otherwise stated). The templates from which the DGPs is generated can be, and frequently are, changed, in response to the requirements of a given application. When a template is changed, the DGPs previously generated from the template and cached for rapid retrieval must be changed to accurately reflect the current template.

In addition to template changes, cache management such as this can be made necessary in response to other system events. For example, the content provided on a particular page may have changed or expired. Content can expire, for example, based on an arbitrarily set timer (e.g., each cached file is assigned a lifetime of a preset number of minutes). The cache management system might further incorporate a general update timer based on, for example, time of day or time since a last general update of all cached files. Any such event (including an explicit one-time call to update a cache) requiring an update of cached files can result in the need for cache management to keep content current. A page deletion or flushing, as defined below, will also require management of cached files.

For example, when a template is changed in a client-server network implementing a method and system such as that disclosed in the Caching Application, the currently cached pages generated from the template are "flushed" from memory. When a page (or any file) is flushed, it is made inaccessible to the file system, but may remain available for backup purposes. This can be accomplished by simply renaming the file. Alternatively, the file can be deleted. A flushing operation thus can refer to an operation that reduces the content population in a cache.

When a request for a flushed customized page is received from a client computer, the requested file (page) will not be available and the page must be regenerated from the new template, for example, according to the teachings of the Caching Application.

However, if the flushed page is a heavily requested page, a large number of simultaneous (concurrent) requests for the page may be received in the time period between the flushing operation and the regeneration of the DGP following the first client request for the page.

This situation can result in a load spike and overburdening of the server computer because each concurrent request for the DGP will result in a demand for the page to be regenerated. The server, and network, performance can be adversely affected by the increase in page regeneration requests. The ability of the server to respond to requests for other content, or to requests for the same page, will be disrupted. A ripple effect through the server and network can also occur because the sudden increase in content regeneration requests will reach back to the back-end processes and databases. A cached page, or series of pages, can also be explicitly flushed, resulting in the same decrease in performance.

Another problem exists in that typically, a family of customized pages is generated from a single template. For example, different language specific versions of a customized page may have been cached, all generated from the same template. Additionally, different versions of a page can be generated based on, for example, browser capabilities. When a change is made to such a template, it has a ripple effect through the many customized page versions generated from the template.

However, it may be that not all affected pages need to be regenerated. For example, some pages may be requested so infrequently that it is computationally inefficient to regenerate these low-frequency pages at the same time as other, more frequently requested, versions of the customized page. Prior art methods for managing cached dynamically-generated customized pages do not provide for selective regeneration of pages. Lastly, simultaneous regeneration of all the selected page versions can have the same adverse affect on server and network performance as an equal number of client-initiated requests.

SUMMARY OF THE INVENTION

Therefore, there is a need for a method and system for cache management of dynamically-generated content that can, in response to a flushing operation, generate a new version of a previously cached customized page and atomically replace the old version in the cache, thereby eliminating the possibility that multiple concurrent requests for a deleted previously cached page will result in multiple page-regeneration requests. Such a cache management system and method should be capable of performing cache management functions on a memory based or persistent file-based physical cache repository.

A further need exists for a method and system for cache management of dynamically-generated content that can select content to generate new versions of DGPs in response to a flushing operation. DGPs can be selected for regeneration based on an arbitrary parameter, such as the elapsed time since a page was last requested.

Still further, a need exists for a method and system for cache management of dynamically-generated content that can control the number of page generation requests that can simultaneously occur, for example, in response to a flushing operation. The number of simultaneous regenerations can be selected based on, for example, a desired network performance level.

In accordance with the present invention, a method and system for cache management of dynamically-generated content are provided that substantially eliminate or reduce the disadvantages and problems associated with prior art methods and systems for caching of dynamically-generated content, including the problem of reduced network performance.

More specifically, the present invention provides a method and system for cache management and regeneration of dynamically-generated content ("DGC") in a client-server computer network. One embodiment of the method of this invention comprises the steps of; in response to a regeneration event, identifying a set of one or more previously cached DGC components affected by the regeneration event; regenerating a new version of each affected DGC component in the set to incorporate a criteria associated with the regeneration event; and replacing each affected DGC component in the set with the respective new version of each. The method can further comprise the step of serving the new version of one or more of the affected DGC components to a client computer in the client-server network in response to a client computer request. The method can further comprise the step of serving the one or more new versions of the affected DGC components in the form of a dynamically-generated page.

Another embodiment of the method of this invention can further comprise the steps of identifying which of the affected DGC components satisfy a threshold criteria, including in the set for regeneration only those affected DGC components that satisfy the threshold criteria, and flushing, instead of replacing, those affected previously cached DGC components that do not satisfy the threshold criteria. The threshold criteria can be an arbitrary value of an arbitrary parameter, such as the elapsed time since the last client computer request for a DGC component or DGP comprising one or more DGC components.

A technical advantage of the method and system for cache management of dynamically-generated customized content of this invention is the ability to generate a new version of a previously cached customized page in response to a flushing operation and atomically replace the old version, thereby eliminating the possibility that multiple concurrent requests by an end-user client computer(s) for a deleted cached page will result in multiple page regeneration requests.

A further technical advantage of the method and system for cache management of dynamically-generated customized content of this invention is the ability to provide cache management for memory-based and persistent file-based cache repositories.

Another technical advantage of the method and system of this invention is the ability to select with which content to regenerate new versions of DGPs in response to a flushing operation.

The method and system for cache management of dynamically-generated content of the present invention provides yet another technical advantage of being able to control the number of page generation requests that can simultaneously occur in response to a regeneration event, such as a flushing operation.

BRIEF DESCRIPTION OF THE DRAWINGS

A more complete understanding of the present invention and the advantages thereof may be acquired by referring to the following description, taken in conjunction with the accompanying drawings in which like reference numbers indicate like features and wherein:

FIG. 2 is a flow chart illustrating the processing associated with one embodiment of the present invention; and FIG. 3 is a flow chart illustrating the processing associated with another embodiment of the method and system of the present invention.

DETAILED DESCRIPTION OF THE INVENTION

Figure 1:
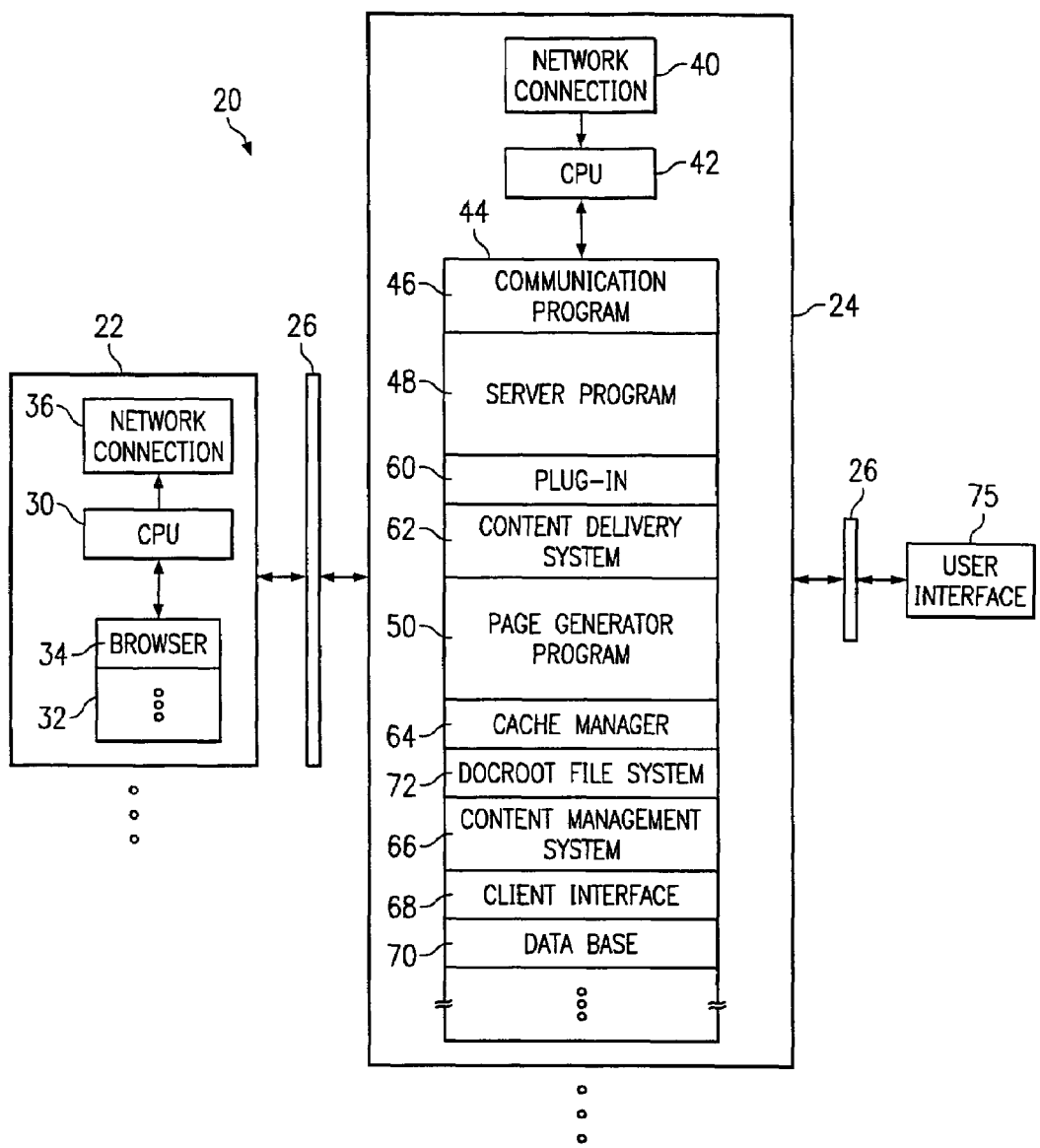
FIG. 1 illustrates a client-server computer network that may be operated in accordance with the present invention.

Preferred embodiments of the present invention are illustrated in the FIGUREs, like numerals being used to refer to like and corresponding parts of various drawings.

Together with, for example, the invention disclosed in the Caching Application, the method and system of the present invention provide the capability to, in a client-server network environment such as the WWW, generate new versions of previously cached content, such as web-pages, without first deleting the old version. In particular, the present invention provides the ability to generate a new version of a customized page, following a regeneration event, to atomically replace a superseded version of the customized page without a significant decrease in the level of network performance. The regeneration event can be a change in the template from which a page is generated, or it can be an explicitly initiated flushing operation to regenerate previously cached content.

The method and system of the present invention can also provide for the selective regeneration of some or all of the content (e.g., pages) generated from a single template. The choice of which content to regenerate can be based on an arbitrary parameter, such as on the elapsed time since the last client request for a page. The generation of new versions of previously cached content can also be controlled according to the teachings of this invention such that no more than a threshold number of content regeneration requests can occur simultaneously. This threshold value can be arbitrarily set. For example, the threshold value can be determined from a static descriptor, such as a configuration variable, or the number of simultaneous regenerations (the threshold value) can be determined based on a desired network performance level.

FIG. 1 illustrates a client-server computer network 20 that may be operated in accordance with the teachings of the present invention. Network 20 includes at least one client computer 22 and at least one server computer 24. Client computer 22 and server computer 24 are connected by a transmission channel 26, which may be any wire or wireless transmission channel, including a fiber optic transmission channel.

Client computer 22 can be a standard computer including a central processing unit ("CPU") 30 connected to a memory (primary and/or secondary) 32. Memory 32 can comprise any combination of RAM, ROM and/or a magnetic storage device such as a hard drive. Memory 32 stores a number of computer programs, including a "browser" 34, as known to those in the art. Browser 34 can be used to communicate with remote server computers 24 and to visually present the information received from server computers 24. Client computer 22 establishes network communications through a standard network connection device 36. Network connection device 36 can be any network connection device as known to those in the art.

Server computer 24 can include standard server computer components, including a network connection device 40, a CPU 42, and a memory (primary and/or secondary) 44. Network connection device 40, CPU 42 and memory 44 can be equivalent components to network connection device 36, CPU 30, and memory 32 of client computer 22. Memory 44 can store a set of computer programs (computer executable software instructions) to implement the processing associated with this invention.

As shown in FIG. 1, memory 44 stores a standard communication program 46 to realize standard network communications. Memory 44 also stores a standard server program 48. Server program 48 can be a standard HTTP software web server program, such as NCSA from the National Center for Supercomputing Applications, Champagne, Ill., or APACHE™ from Apache HTTP Server Project, Lincoln, Nebr.

In accordance with the present invention, standard server program 48 can be instructed to make a call to plug-in 60. Standard HTTP server programs include a feature that allows another program to be called when a certain condition is satisfied. In this case, plug-in 60 is called by server program 48 when server program 48 receives a request for a standard file name, instead of a request for a previously cached customized file name.

When invoked by server program 48, plug-in 60 can map the requested standard file name into a customized file request as per the teachings of the Caching Application (i.e., into a custom uniform resource locator ("CURL"). The customized file request can be implemented as a combination of the initial standard file name and a selected attribute of the computer user requesting the file. The selected attribute may be the browser used by the client computer 22, the domain name of the user's network connection, the platform (computer type) of the client computer 22, a user requested page language, or some other attribute that specifies the format capabilities of client computer 22.

Memory 44 can also store a page generator program 50. Page generator program 50 is invoked when a customized file request cannot be matched to an existing set of cached customized files stored on, for example, server computer 24. In this invention, plug-in 60 invokes page generator program 50 when a user request is received for a customized page that is not cached. When invoked by plug-in 60, page generator program 50 creates a customized file corresponding to the customized file request. Page generator program 50 can thus generate a customized file in response to the file request for client computer 22. The customized file created by page generator program 50 of server computer 24 is forwarded to and stored (cached) by plug-in 60. Server program 48 can pass the contents of the customized file to client computer 22.

Memory 44 can also store Content Management System ("CMS") 64 and database 70, that together can be used to create, test, modify, manage and store page templates and other content that can be made available to page generator program 50. Content Management System 66 can also be used to manage metadata associated with the page templates used to dynamically generate content. Client interface program 68 is associated with and interfaces with CMS 66. Client interface program 68 can be the interface program to CMS 66 for developing page templates. Client interface program 68 can also be used for modifying and deleting page templates.

Client interface program 68 can be a Java based interface and can be stored in memory 44 of server 24, or at another server location. Client interface program 68 can be called via user interface 75, which is communicatively connected to server 24 (or to any other server on which client interface program 24 is stored) by a second transmission channel 26. User interface 75 can be a graphical user interface accessed by a keyboard and/or mouse and viewed on a computer monitor. User interface 75 can also be any other user-to-computer interface as known to those in the art. User interface 75 can be situated locally or remotely to server 24. User interface 75 can call client interface program 68 (i.e., access the server storing client interface program 68) over transmission channel 26. Transmission channel 26 can be a direct connection, or a network connection, such as an internet connection.

Database 70 can likewise be stored within memory 44 of server 24, or at another server location. Database 70 can be a standard relational database. Memory 44 can also store cache manager 64, which provides the cache management functionality of the present invention, as described more fully below.

According to the teachings of the present invention, if the contents of a template are changed, for example, by a human user via user interface 75 and client interface program 68 to CMS 66, logically the pages that have been generated from the template will be outdated. When a template is changed, cache manager 64 is called and accesses docroot file system 72 to identify all the currently cached files that were generated from the now altered template. It should be noted that cached files can also be stored in a memory-based, rather than a persistent file-based, cache repository. In such a case, docroot file system 72 can represent a filing system for a memory-based cache repository.

The files generated from the now altered template are identified by cache manager 64 so that they can be regenerated from the new version of the template. In one embodiment of the method and system of this invention, previously cached files can be selected for regeneration based on some arbitrary criteria, such that not all affected files are regenerated.

The process of replacing previously cached pages (files) with updated versions occurs, according to the teachings of this invention, in response to a regeneration event. A regeneration event can comprise, for example, a user change to a template affecting previously cached customized pages, an explicit flushing operation, or a change to the contents of a customized page. A flushing operation is a process by which some or all previously cached pages are made inaccessible (e.g., by renaming) to a user request, but may still be on the system and accessible to the page regeneration system for the purpose of, for example, backup in case of an error (i.e., the content is logically deleted). A flushing operation can, alternatively, also comprise physically deleting the affected content. A flushing operation can thus comprise any such action that is used to reduce the accessible content population in a cache.

In prior art systems, unlike in the present invention, a flushing operation results in the deletion of the affected cached pages (content), which are then regenerated in response to a client request. A flushing operation can be explicitly initiated by a user, or can occur in response to some other event that can be arbitrarily set. For example, a flushing operation may be a function of a time dependent event, such as a process set to run on a specified interval. A process could be set to run every night, for example, to generate, a new front page for a web site to capture a new headline, a new advertisement, etc. It thus may be the case that the template itself does not change, but instead it is the page content that changes, requiring a flushing operation.

A template can be changed by a user via user interface 75 and client interface program 68, typically through the use of a text editor. Client interface program 68 can comprise a dedicated communication link with CMS 66, or can comprise a network connection, for example, over the internet. A user can thus interface with CMS 66 via a direct local or remote connection, or via a networked connection. The interface connection between user interface 75 and client interface program 68 can in fact go through a different web server to access CMS 66. The interface connection can be configured, for example, as a virtual private network. When a template is changed, the changed template is forwarded to CMS 66, and CMS 66 notifies page generator program 50 that the template has been changed.

The templates from which customized pages are generated can be stored in database 70 associated with CMS 66, or in any other accessible storage location, such as another location on the file system or in a source code system. Additionally, copies of some templates can be stored at each CDS 62. Each CDS 62 can have its own template file system to store the templates. Typically there is a central CMS 66 that serves one or more CDS's 62. More than one CMS 66 can be installed on a server 24, but each CMS 66 is logically distinct from every other CMS 66. A CMS 66 can be configured for different purposes and can comprise a collection of processes that all run on one server 24. CDS 62 is a logical concept that can be implemented on a single server 24, as shown in FIG. 1, or on a family of servers 24.

Cache manager 64 initiates the page regeneration process of the present invention in response to the notification from CMS 66 that a template has been changed. Cache manager 64 is a single process physical concept that comprises a software program (computer executable instructions) that can reside on the same server 24 as CMS 66, or that can reside on a different server 24. Cache manager 64 must be configured so as to be able to access docroot file system 72. Docroot file system 72 is a file system that may reside on server 24 (stored in memory 44) and can be on the same server 24 as cache manager 64. Cache manager 64 and docroot file system 72 may thus be co-resident on a single machine. They can, however, also reside on different servers 24, depending on the network topology.

Docroot file system 72 is shared between cache manager 64 and its associated server 24, regardless of whether cache manager 64 is located within server 24. The dynamically-generated content of this invention can be cached in docroot file system 72. Because docroot file system 72 contains the customized pages (or content components) and is a file system that is shared between server 24 and cache manager 64, both server 24 and cache manager 64 have access to the files in docroot file system 72. Docroot file system 72 can be updated to track changes resulting from regenerating new customized pages and replacing superceded customized pages.

DGC can be cached in a variety of network locations. If, however, DGC is cached in docroot file system 72 on the server 24 where web server program 48 is running, cache manager 64 must also be running on the same server 24, or on another server 24 that has direct access to docroot file system 72. Similarly, docroot file system 72 can be located on a server 24 other than the one on which web server program 48 is located, but web server program 48 must have direct access to docroot file system 72. A typical configuration has web server program 48, docroot file system 72 and cache manager 64, residing on the same server 24.

FIG. 2 is a flow chart diagramming the operation of one embodiment of the method and system for cache regeneration and management of dynamically-generated content of this invention. At step 100, a regeneration event occurs (e.g., a page template is modified, or a flushing operation is explicitly initiated). Cache manager 64 is notified of the regeneration event at step 105. At step 110, cache manager 64 initiates the regeneration of new versions of the previously cached content (e.g., customized pages) affected by, for example, the template modification or flushing operation. Cache manager 64 accesses docroot file system 72 and identifies the affected content at step 120.

At step 130, cache manager 64 invokes page generator program 50, which regenerates the identified customized pages according to the teachings of the method of this invention. The regeneration of affected pages can be limited to prevent overloading of backend systems. Cache manager 64 receives, at step 135, the newly generated versions of the affected customized pages. At step 140, the superceded versions of the customized pages affected by the regeneration event are atomically replaced with the newly generated pages, which are cached and made available for subsequent client requests. Docroot file system 72 is updated to track any file changes. At step 150, the new customized pages are served in response to client requests. In accordance with the teachings of this invention, the superceded page versions continue to be served to clients during the latency period from the initiation of the regeneration event to the atomic replacement of the superceded pages with the newly generated customized pages.

The regeneration of customized pages is made possible by the use of the customized file name, i.e., the custom URL ("CURL"). The CURL incorporates the pertinent identifying information for a requested file name in such a manner that the cache manager 64 and page generator program 50 can work together to reconstruct the content on a page as required. The CURL can include parameters (attributes) that are keyed to a particular application (in this case application refers not to a program, but to a defined use), such that the page generator program 50 knows to execute a particular template associated with the parameter (i.e., with the filename (CURL)) to generate the requested page (content). The parameter can be a parameter in the original URL request, or a parameter incorporated into the CURL by the mapping performed by plug-in 60.

It should be noted that a CURL can be, beyond a custom filename unique to a particular application or user, a generic custom filename to which an original URL can be mapped such that a cached page (content) can be accessed and served to different users. Such a default filename could be used, for example, for content that is not user, time, or place specific. Further, the CURL can incorporate, as a the selected attribute, or as the default attribute, no user attribute. This "no user" attribute can thus be a generic, non-user specific attribute that the page generator program 50 can recognize and know to execute a particular template associated with that parameter.

The method and system of this invention provide an important advantage in that cache manager 64 does not, unlike in the prior art, immediately delete the files affected by, for example, a template change. Instead, the method and system of this invention generate new versions of the affected content from the new template, and then replace the superceded content with the newly generated content. Cache manager 64 simulates a remote client to request a new version of an affected page and then replaces the currently cached page with the new version. The replacement of the affected customized page can occur very rapidly once the page regeneration is complete, resulting in a transparent transition to the new customized page. The file replacement operations performed by the embodiments of the present invention are API (Application Program Interface) dependent, and can be different depending on whether the cache depository is a persistent file system or an in-memory cache.

The method and system of this invention thus can improve network performance over the performance of prior art systems following a regeneration event.

Unlike in prior art systems, an outdated customized page is not deleted from the cache before a new page is generated and thus, a network system implementing this invention will not be overloaded by multiple page regeneration requests in the event that multiple client requests for a recently deleted page are simultaneously received. Although the method of this invention, upon replacing a superceded page with a current version, can still expect to experience a slight decrease in network performance in the event that a large number of requests for a cached page occur simultaneously, this delay is moved outward to web server 48 and does not result in a decrease in the performance level of CMS 66. The delivery environment of a network system implementing the present invention can be designed to incorporate a greater number of web servers to handle this anticipated load.

In this way, the embodiments of the method and system of this invention can eliminate or greatly reduce the disruptive effects on network performance that can occur with prior art systems during the time that it takes to regenerate a heavily requested page following a flushing operation. The embodiments of the method and system of this invention provide a replacement for a superceded page instead of simply deleting the superceded page and waiting for a client request to initiate the regeneration of a new customized page. Pages that are expensive to regenerate (i.e., that take a long time to regenerate) can thus be regenerated in a manner transparent to clients requesting the pages. Network performance will therefore not be significantly affected.

The method and system of this invention can, upon replacing a superceded page with a new version, save the prior version of the customized page as a backup in the event an error occurs in the newly generated replacement page. Alternatively, the superceded page can simply be deleted. In the time span between the initiation of the page regeneration process and the replacement of the outdated customized page with a new version, client requests for the affected page are responded to with the currently cached (outdated) customized page. Once the outdated page is replaced, client requests will be served the updated customized page.

The method and system of the present invention provide a further advantage in the situation where a change in a page template affects a family of customized pages that were generated from the modified template. A number of different variations of a page can be generated from the same template based on, for example, the language requested by a user. In addition to cache language specific versions of a page, different versions of a page can also be generated from the same template based on the capabilities of the user's browser, e.g., different versions of a page may be generated and cached because they may render differently on different browsers. Additionally, the same template can be used to generate different versions of a page based on Content ID. Content ID is a feature of the method and system of this invention by which the same template can be used to retrieve different records from a database, such as relational database 70, to create versions of a customized page that are dependent on the particular record selected. The selected record can be determined based on user input.

Following a regeneration event, such as a flushing operation, it may not be desirable to regenerate every version of an affected page. For example, some versions of an outdated page may not have been accessed in a long period of time and thus are considered high latency (low request) pages. The embodiments of the method and system of this invention can incorporate threshold criteria for arbitrary parameters that can be used to control which pages are regenerated following a regeneration event.

In particular, one such parameter can be the elapsed time since the last client computer request for a customized page. If a page has not been requested in an amount of time equal to or greater than a threshold amount of time, the page is not selected for regeneration and is instead simply deleted. Those pages not selected for regeneration and replacement according to the teachings of this invention, are instead regenerated according to the teachings of the Caching Application (i.e., following a specific user request for the page). The threshold time criteria can be an arbitrary period determined according to the needs of a specific network application.

Once an affected customized page has been selected for regeneration, the method and system of this invention extract the pertinent parameters for regenerating the customized page from the page's custom cached file name, assigned in accordance with the teachings of the Caching Application. For example, the language of the page, Content ID, and browser options can be determined from the cached file name. This information is supplied to page generator program 50 by cache manager 64 when requesting a new version of the page. In this way, the embodiments of the method and system of this invention ensure that a new customized page will be regenerated according to the same specifications as the superceded page it will replace, while also incorporating the changes made to the page template, if any.

FIG. 3 is a flowchart illustrating the operation of a selective regeneration embodiment of the present invention. Like-labeled steps of FIG. 3 are functionally equivalent to like-labeled steps of FIG. 2. The description of FIG. 3 is the same as that of FIG. 2, with the following exceptions: at step 125, this embodiment of the method of this invention determines which of the affected pages satisfy a threshold criteria; those pages satisfying the threshold criteria are regenerated from the new template at step 132, in a manner functionally equivalent to step 130 of FIG. 2. Those pages not satisfying the threshold criteria are deleted. The embodiment of this invention illustrated in FIG. 3 is otherwise functionally equivalent to the embodiment of FIG. 2. The threshold criteria can be an arbitrarily set parameter, such as the elapsed time since a page was last requested by a client computer 22.

As described above, there is a latency period that occurs between, for example, a change to a page template and the replacement of the outdated cached pages (generated from the previous version of the template) with customized pages generated from the new version of the template. The latency period is dependent upon the characteristics of the page being regenerated, i.e., a complex page will have a longer latency period than a simple page because it takes longer to regenerate. During the latency period, the currently cached page will be served by web server program 48 in response to client requests for the customized page. Once a new version of a customized page is generated, it is atomically replaced (as atomically as the file process allows) with the old version. The page replacement is thus essentially an indivisible action, such that from the file system standpoint, a client of the file system one moment sees the old version and the next moment will see the new version. There is no moment where a client is left without access to at least one of the two page versions. The replacement is thus transparent to a user.

A content regeneration process according to the teachings of this invention could itself put a great stress on network server 24 such that network performance could be reduced. This can result because cache manager 64 of the present invention is capable of producing regeneration requests in parallel. For example, if there are many pages that have been selected for regeneration, the effect on network performance if cache manager 64 produced a large number of simultaneous regeneration requests would be almost as detrimental as if the pages were simply deleted and allowed to be regenerated in response to user requests (as in the prior art).

To prevent this possible degradation of network performance, the embodiments of the method and system of this invention can control, through a configuration parameter, the number of regeneration requests that cache manager 64 can simultaneously produce. For example, a threshold, n, can be set such that no greater than n regeneration requests can be outstanding at a time. The value of n can be a preset value arbitrarily determined according to the network topology, or based on the needs of a particular application. For example, the number of such requests (the value of n) can be set based on the level of network performance desired.

Although the present invention has been described in detail herein with reference to the illustrative embodiments, it should be understood that the description is by way of example only and is not to be construed in a limiting sense. It is to be further understood, therefore, that numerous changes in the details of the embodiments of this invention and additional embodiments of this invention will be apparent to, and may be made by, persons of ordinary skill in the art having reference to this description. It is contemplated that all such changes and additional embodiments are within the spirit and true scope of this invention as claimed below.

What is claimed is:

1. A method for cache management and regeneration of dynamically-generated content ("DGC") in one or more server computers within a client-server computer network, comprising the steps of:

in response to a regeneration event notification from a content management system received by a cache manager, identifying a set of one or more previously cached DGC components affected by said regeneration event using the cache manager;

using the cache manager to invoke a page generator to regenerate each affected DGC component using one or more attributes from a corresponding file name for each DGC component, wherein the attributes are used by the page generator to determine how to regenerate content for each affected DGC;

regenerating a new version of each affected DGC component in said set to incorporate a criteria associated with said regeneration event based on the one or more attributes associated with that affected DGC component, wherein the page generator performs the regenerating; and replacing each affected DGC component in said set with said respective new version of each using the cache manager.

2. The method of claim 1, further comprising the step of serving said new version of one or more of said affected DGC components to a client computer in said client-server network in response to a request from said client computer.

3. The method of claim 1, further comprising the step of serving said new version of one or more of said affected DGC components in the form of a dynamically-generated page to a client computer in said client-server network in response to a request from said client computer.

4. The method of claim 1, wherein:

said identifying step further comprises identifying which of said affected DGC components satisfy a threshold criteria;

said set of affected DGC components comprises only those affected DGC components that satisfy said threshold criteria; and said replacing step further comprises flushing those of said affected previously cached DGC components that do not satisfy said threshold criteria.

5. The method of claim 4, wherein said threshold criteria is an arbitrary value of an arbitrary parameter.

6. The method of claim 5, wherein said arbitrary parameter is an elapsed time since the last client computer request for a DGC component or for a dynamically-generated page.

7. The method of claim 1, wherein any one or more of said identifying, regenerating and replacing steps can be performed at a different one of said one or more server computers from each other.

8. The method of claim 1, wherein said regenerating step further comprises the step of limiting to a preset threshold value the number of affected DGC component regenerations that can simultaneously occur.

9. The method of claim 8, wherein said preset threshold value is arbitrarily determined according a desired network performance level.

10. The method of claim 8, wherein said preset threshold value is determined by a static descriptor, such as a configuration variable.

11. The method of claim 1, wherein said regeneration event comprises a change to a page template, an explicit flushing event, or a change to a DGC component.

12. The method of claim 11, wherein said explicit flushing event comprises the expiration of a preset time period.

13. The method of claim 1, wherein said criteria associated with said regeneration event is a change to a page template from which one or more previously cached dynamically-generated pages ("DGPs") were generated.

14. The method of claim 1, wherein said criteria associated with said regeneration event is a change to the content of one or more of said previously cached DGC components, or no criteria.

15. The method of claim 1, wherein every cached DGC component is associated with a custom cached file name comprising a combination of an initial file request name with a selected attribute of a computer user.

16. The method of claim 15, wherein said selected attribute is selected from the group including browser name, user language, computer domain, computer platform, and content ID.

17. The method of claim 15, wherein said selected attribute is a default attribute.

18. The method of claim 17, wherein said default attribute is no user attribute.

19. The method of claim 15, wherein said selected attribute is used in said regenerating step to regenerate said new versions of said affected DGC components.

20. The method of claim 15, wherein said selected attribute is keyed to a particular application.

21. The method of claim 1, further comprising the step of updating a docroot file system to indicate changes resulting from replacing said affected DGC components.

22. The method of claim 21, wherein said docroot file system is associated with a memory-based cache repository or a file-based cache repository.

23. A system for cache management and regeneration of dynamically-generated content ("DGC") in one or more server computers within a client-server computer network, comprising one or more computer storage media storing instructions comprising:

instructions for, in response to notification of a regeneration event received from a content management system, identifying using a cache manager a set of one or more previously cached DGC components affected by said regeneration event;

instructions for the cache manager to invoke a page generator to regenerate each affected DGC component using one or more attributes from a corresponding file name for each DGC component, wherein the attributes are used by the page generator to determine how to regenerate content for each affected DGC;

instructions for regenerating using the page generator a new version of each affected DGC component in said set to incorporate a criteria associated with said regeneration event based on the one or more attributes associated with that DGC component; and instructions for replacing each affected DGC component in said set with said respective new version of each using the cache manager.

24. The system of claim 23, further comprising instructions for serving said new version of one or more of said affected DGC components to a client computer in said client-server network in response to a request from said client computer.

25. The system of claim 23, further comprising instructions for serving said new version of one or more of said affected DGC components in the form of a dynamically-generated page ("DGP") to a client computer in said client-server network in response to a request from said client computer.

26. The system of claim 23, wherein:

said instructions for identifying further comprise instructions for identifying which of said affected DGC components satisfy a threshold criteria;

said set of affected DGC components comprises only those affected DGC components that satisfy said threshold criteria; and said instructions for replacing further comprise instructions for flushing those of said affected previously cached DGC components that do not satisfy said threshold criteria.

27. The system of claim 26, wherein said threshold criteria is an arbitrary value of an arbitrary parameter.

28. The system of claim 27, wherein said arbitrary parameter is an elapsed time since the last client computer request for a DGC or for a DGP.

29. The system of claim 23, wherein said instructions for regenerating further comprise instructions for limiting to a preset threshold value the number of affected DGC component regenerations that can simultaneously occur.

30. The system of claim 29, wherein said preset threshold value is determined according a desired network performance level or according to a static descriptor, such as a configuration variable.

31. The system of claim 23, wherein said regeneration event comprises a change to a page template, an explicit flushing event, or a change to a DGC component.

32. The system of claim 23, wherein said criteria associated with said regeneration event is a change to a page template from which one or more previously cached DGPs were generated.

33. The system of claim 23, wherein said criteria associated with said regeneration event is a change to the content of one or more of said previously cached DGC components.

34. The system of claim 23, wherein said criteria associated with said regeneration event is no change.

35. The system of claim 23, wherein every cached DGC component is associated with a custom cached file name comprising a combination of an initial file request name with a selected attribute of a computer user.

36. The system of claim 35, wherein said selected attribute is selected from the group including browser name, user language, computer domain, computer platform, and content ID.

37. The system of claim 35, wherein said selected attribute is used in said regenerating step to regenerate said new versions of said affected DGC components.

38. The system of claim 35, wherein said selected attribute is not a user attribute.

39. The system of claim 35, wherein said selected attribute is keyed to a particular application.

40. The system of claim 23, further comprising instructions for updating a docroot file system to indicate changes resulting from replacing said affected DGC components.

41. The system of claim 40, wherein said docroot file system is associated with a cache repository.

42. The system of claim 41, wherein said cache repository is a file-based cache repository.

43. A system for cache management and regeneration of dynamically-generated content ("DGC") in one or more server computers within a client-server computer network, comprising:
   one or more client computers;
   a web site system coupled to the one or more client computers over the network, the web site system comprising one or more servers for serving a web site to the client computer over the network, wherein the web site system is configured to:
   detect a regeneration event to affect one or more previously cached DGC components;
   in response to said regeneration event, identify a set of one or more of said previously cached DGC components affected by said regeneration event using a cache manager;
   cause the cache manager to invoke a page generator to regenerate each affected DGC component using one or more attributes from a corresponding file name for each DGC component, wherein the attributes are used by the page generator to determine how to regenerate content for each affected DGC;
   regenerate using a page generator a new version of each affected DGC component in said set to incorporate a criteria associated with said regeneration event based on the one or more attributes associated with that affected DGC component; and
   replacing each affected DGC component in said set with said respective new version of each using the cache manager.

44. The system of claim 43, wherein said regeneration event is initiated by a user via a user interface.

45. The system of claim 44, wherein said user interface comprises a standard user-to-computer interface to access an interface program.

46. The system of claim 43, wherein initiating said regeneration event comprises changing a template affecting one or more of said previously cached DGC components.

47. The system of claim 43, wherein initiating said regeneration event comprises initiating a flushing operation.

48. The system of claim 43, wherein initiating said regeneration event comprises initiating a flushing operation in response to a change in the content of one or more of said previously cached DGC components.

49. The system of claim 43, further comprising the step of serving said new version of one or more of said affected DGC components to a client computer in said client-server network in response to a request from said client computer.

50. The system of claim 43, further comprising the step of serving said new version of one or more of said affected DGC components in the form of a dynamically-generated page ("DGP") to a client computer in said client-server network in response to a request from said client computer.

51. The system of claim 43, wherein:
   said identifying step further comprises identifying which of said affected DGC components satisfy a threshold criteria;
   said set of affected DGC components comprises only those affected DGC components that satisfy said threshold criteria; and
   said replacing step further comprises flushing those of said affected previously cached DGC components that do not satisfy said threshold criteria.

52. The system of claim 51, wherein said threshold criteria is an arbitrary value of an arbitrary parameter.

53. The system of claim 52, wherein said arbitrary parameter is an elapsed time since the last client computer request for a DGC component or a DGP.

54. The system of claim 43, wherein any one or more of said initiating, identifying, regenerating and replacing steps can be performed at a different one of said one or more server computers from each other.

55. The system of claim 43, wherein said regenerating step further comprises the step of limiting to a preset threshold value the number of affected DGC component regenerations that can simultaneously occur.

56. The system of claim 43, wherein said criteria associated with said regeneration event is a change to a page template from which one or more previously cached DGPs were generated.

57. The system of claim 43, wherein said criteria associated with said regeneration event is a change to the content of one or more of said previously cached DGC components, or no criteria.

58. The system of claim 43, wherein every cached DGC component is associated with a custom cached file name comprising a combination of an initial file request name with a selected attribute of a computer user.

59. The system of claim 58, wherein said selected attribute is selected from the group including browser name, user language, computer domain, computer platform, and content ID.

60. The system of claim 58, wherein said selected attribute is used in said regenerating step to regenerate said new versions of said affected DGC components.

61. The system of claim 43, further comprising the step of updating a docroot file system to indicate changes resulting from replacing said affected DGC components.

* * * * *